US012587886B2

(12) United States Patent　　　(10) Patent No.:　US 12,587,886 B2
Campbell　　　　　　　　　　　　(45) Date of Patent:　Mar. 24, 2026

(54) NETWORK DRIVE TESTING BASED ON POPULATION DISTRIBUTION

(71) Applicant: DISH Wireless L.L.C., Englewood, CO (US)

(72) Inventor: Heather Campbell, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 328 days.

(21) Appl. No.: 18/463,070

(22) Filed: Sep. 7, 2023

(65) Prior Publication Data

US 2025/0088877 A1　　Mar. 13, 2025

(51) Int. Cl.
　*H04W 24/08*　　　(2009.01)
　*H04W 64/00*　　　(2009.01)
(52) U.S. Cl.
　CPC ......... *H04W 24/08* (2013.01); *H04W 64/006* (2013.01)
(58) Field of Classification Search
　CPC ............................ H04W 24/08; H04W 64/006
　USPC ...................................................... 455/67.11
　See application file for complete search history.

(56) References Cited

U.S. PATENT DOCUMENTS

| | | | | |
|---|---|---|---|---|
| 6,539,221 B1 * | 3/2003 | Vasudevan | ............ | H04W 16/18 |
| | | | | 455/67.11 |
| 7,535,873 B1 * | 5/2009 | Sigg | ...................... | H04W 36/18 |
| | | | | 370/335 |
| 7,643,936 B1 * | 1/2010 | Boxberger | ............ | H04W 24/08 |
| | | | | 701/461 |
| 2010/0323689 A1 * | 12/2010 | Topaltzas | .............. | H04W 24/06 |
| | | | | 455/425 |
| 2014/0357298 A1 * | 12/2014 | Koskinen | .............. | G01S 5/0027 |
| | | | | 455/456.1 |
| 2018/0049039 A1 * | 2/2018 | Chandrasekaran | ... | H04W 16/18 |
| 2021/0377905 A1 * | 12/2021 | Chen | ................. | H04W 56/0045 |
| 2022/0369067 A1 * | 11/2022 | Chen | ..................... | H04W 4/029 |
| 2023/0199513 A1 * | 6/2023 | Colonna | .............. | H04W 4/021 |
| | | | | 455/456.1 |

OTHER PUBLICATIONS

Accuver, XCAL, accessed Aug. 14, 2024 at https://www.accuver.com/sub/products/view.php?idx=6.
Accuver, XCAP, accessed Aug. 14, 2024 at https://www.accuver.com/sub/products/view.php?idx=14.
Alaska Plan, Federal Communications Commission, Aug. 23, 2016, accessed Aug. 14, 2024 at https://www.fcc.gov/alaska-plan.

(Continued)

*Primary Examiner* — April G Gonzales
(74) *Attorney, Agent, or Firm* — Seed Intellectual Property Law Group LLP

(57)　　　　　　ABSTRACT

Technologies for population distribution-based drive testing are disclosed. An example method includes determining geographic units for drive testing based on a proposed coverage of the communications network and a population distribution of potential users of the communications network, and for each geographic unit: determining a mobile test pattern and a set of stationary test locations for drive testing, and causing performance of drive testing in accordance with the mobile test pattern and set of stationary test locations.

16 Claims, 7 Drawing Sheets

(56)          References Cited

OTHER PUBLICATIONS

Applications of American H Block Wireless L.L.C., DBSD Corporation, Gamma Acquisition L.L.C., and Manifest Wireless L.L.C. for Extension of Time, Order of Modification and Extension of Time to Construct, WT. Docket No. 18-197, Sep. 11, 2020, 26 pages.
Bartlett, II et al., "Organizational Research: Determining Appropriate Sample Size in Survey Research," Information Technology, Learning, and Performance Journal, 19(1), Spring 2001, 8 pages.
Cochran, Sampling Techniques, 3rd ed., 1977, pp. 57-58 and 75-76.
DISH's Buildout Submission and Proposed Testing Methodology; Monitoring DISH's Compliance with Conditions Granting an Extension of Time to Complete Construction of Facilities and Buildout Commitments, WT Docket No. 22-212, Sep. 29, 2023, 3 pages.
Establishing the Digital Opportunity Data Collection, WC Docket No. 19-195, Apr. 11, 2022, 39 pages.

* cited by examiner

*200*

NETWORK DRIVE TESTING BASED ON POPULATION DISTRIBUTION

BACKGROUND

In telecommunications, 5G is the fifth-generation technology standard for broadband cellular networks. 5G networks are cellular networks, in which the service area is divided into small geographical areas called cells. 5G wireless devices in a cell can communicate by radio waves with a cellular base station (e.g., located on a cellular tower) via fixed antennas, over frequency channels. The base stations can be connected to switching centers in the telephone network and routers for Internet access by high-bandwidth optical fiber or wireless backhaul connections. There is a need for technologies that facilitate efficient testing of cellular networks.

BRIEF SUMMARY

In some implementations of a communications network (e.g., a 5G network), the entirety or at least some components or elements of the network core (e.g., 5G core) can be implemented logically or virtually, via one or more cloud service providers. The network core communicates with various cell sites that are located in different geographic or network locations, subjecting to control of same or different entities.

For regulatory, industrial, or other reasons, proposed coverage of a communications network may be required to cover a certain percentage (e.g., 70%) of the population in a service market, country, or region, and to meet certain performance standard (e.g., access to average download speeds equal to or greater than 35 Mbps). To prove or demonstrate satisfaction of the requirements, conventional drive test methodology may use a comprehensive grid-based pattern which involves testing the network from side to side, from end to end, or otherwise in its entirety to determine network coverage statistics. The conventional technology can be cumbersome and taxing.

In some embodiments, a computer-implemented method for drive testing a communications network includes determining a plurality of geographic units for drive testing based on a proposed coverage of the communications network and a population distribution of potential users of the communications network, and for each geographic unit of the plurality of geographic units: determining a mobile test pattern and a set of stationary test locations for drive testing, and causing performance of drive testing in accordance with the mobile test pattern and set of stationary test locations.

In some embodiments, the population distribution is represented by census data and the plurality of geographic units includes one or more census tracts. In some embodiments, determining the plurality of geographic units includes filtering out at least one census tract based on intersecting the proposed coverage of the communications network with boundaries of census tracts.

In some embodiments, determining the mobile test pattern comprises determining one or more routes based on a boundary of the geographic unit. In some embodiments, determining the mobile test pattern comprises determining at least one of a middle traversal of the geographic unit or a full or partial loop around a population centroid of the geographic unit.

In some embodiments, determining the set of stationary test locations comprises performing an even distribution of the set of stationary test locations along a perimeter of the geographic unit, subject to one or more constraints. In some embodiments, the one or more constraints include at least one of a proximity to commercial areas, spacing to a concentration of residential properties, a body of water, a lack of intersections, or a private gated community.

In some embodiments, determining the mobile test pattern and the set of stationary test locations is based on a partial coverage area of the communications network within the geographic unit.

In some embodiments, a drive test system for a communications network includes at least one memory that stores computer executable instructions and at least one processor that executes the computer executable instructions to cause actions to be performed. The actions include determining a plurality of geographic units for drive testing based on a proposed coverage of the communications network and a population distribution of potential users of the communications network, and for each geographic unit of the plurality of geographic units: determining a mobile test pattern and a set of stationary test locations for drive testing, and causing performance of drive testing in accordance with the mobile test pattern and set of stationary test locations.

In some embodiments, determining the plurality of geographic units comprises excluding at least one geographic unit based on intersecting the proposed coverage of the communications network with boundaries of geographic units. In some embodiments, determining the mobile test pattern comprises determining one or more routes based on a boundary of the geographic unit. In some embodiments, determining the mobile test pattern comprises determining at least one of a middle traversal of the geographic unit or a full or partial loop around a population centroid of the geographic unit. In some embodiments, determining the set of stationary test locations comprises performing an even distribution of the set of stationary test locations along a perimeter of the geographic unit, subject to one or more constraints. In some embodiments, determining the mobile test pattern and the set of stationary test locations is based on a partial coverage area of the communications network within the geographic unit.

In some embodiments, a non-transitory computer-readable medium stores contents that, when executed by one or more processors, cause actions to be performed. The actions include determining a plurality of geographic units for drive testing a communications network based on a proposed coverage of the communications network and a population distribution of potential users of the communications network, and for each geographic unit of the plurality of geographic units: determining a mobile test pattern and a set of stationary test locations for drive testing, and causing performance of drive testing in accordance with the mobile test pattern and set of stationary test locations.

In some embodiments, the population distribution is represented by census data and the plurality of geographic units includes one or more census tracts. In some embodiments, determining the plurality of geographic units comprises excluding at least one census tract based on intersecting the proposed coverage of the communications network with boundaries of census tracts.

In some embodiments, determining the mobile test pattern comprises determining one or more routes based on a boundary of the geographic unit. In some embodiments, determining the mobile test pattern comprises determining at least one of a middle traversal of the geographic unit or a full or partial loop around a population centroid of the geographic unit. In some embodiments, determining the set of stationary test locations comprises performing an even distribution of the set of stationary test locations along a perimeter of the geographic unit, subject to one or more constraints.

DETAILED DESCRIPTION

Figure 1:
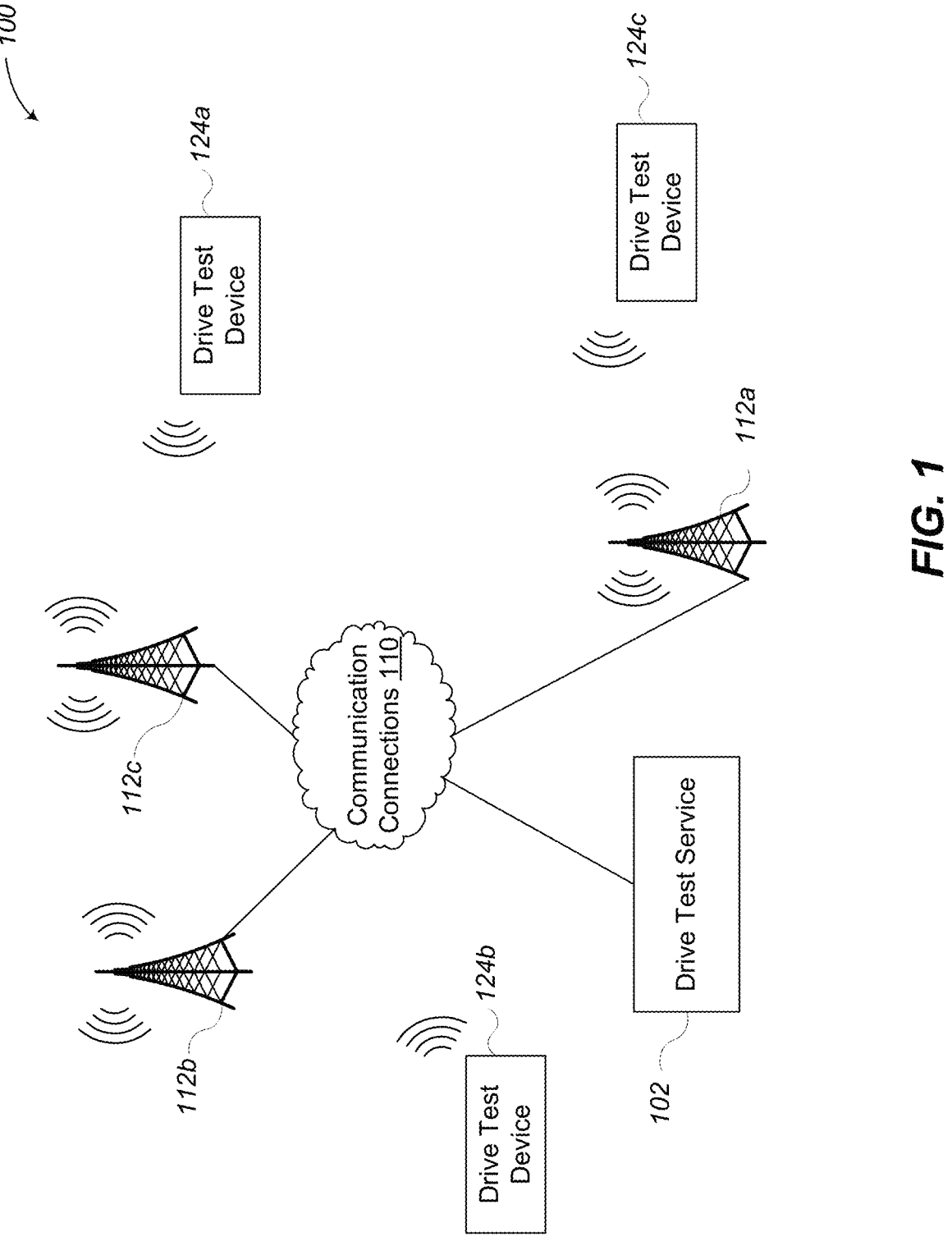
FIG. 1 is a block diagram illustrating an example networked environment for population distribution-based drive test for a communications network in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances. References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

In some embodiments, the presently disclosed technology uses population distribution data (e.g., U.S. census) to provide a statistically significant representation of network performance. Drive tests can be automatically pathed and directed in association with a census track, census block, or other geographic unit of population. In some embodiments, automatic sampling of the geographic units is performed prior to drive test route planning and execution. As such, the presently disclosed technology can intelligently adapt to the geographic distribution of population, save significantly on resources required for drive tests, and reduce the load on network to prove or demonstrate satisfaction of coverage requirements.

FIG. 1 is a block diagram illustrating an example networked environment 100 for population distribution-based drive test for a communications network in accordance with some embodiments of the techniques described herein. Environment 100 includes a plurality of cells 112a-112c, a plurality of drive test devices 124a-124b, a drive test service 102, and communication connections 110. Illustratively, the cells 112a-112c correspond to cell sites (e.g., cellular towers) that together implement a proposed 5G cellular communications network (or at least a service or function thereof). The cells 112a-112c may include or be in communication with base stations, radio back haul equipment, antennas, or other devices, which are not illustrated for ease of discussion.

Each cell 112 provides 5G compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via communication connections 110. Communication connections 110 include one or more wired or wireless networks, which may include a series of smaller or private connected networks that carry information between the cells 112a-112c.

The drive test devices 124a-124c are mobile radio network air interface measurement equipment that can detect and record a wide variety of the physical and virtual parameters of mobile cellular service in a given geographical area, e.g., by communicating with one or more of the cells 112a-112c. One or more drive test devices can be installed on a mobile vehicle (e.g., mounted to a car, truck, or van that may or may not be autonomous) or be used as portable device(s) (e.g., carried by a person). The drive test devices can include highly specialized electronic devices that interface to OEM mobile handsets or other user equipment (UE), to facilitate measurements that are comparable to actual experiences of a user of the network. In various embodiments, the data collected by a drive test device during drive testing can include time-stamps identifying when the test was initiated or completed, latitude and longitude of the test, Cell ID of the serving cell or tower, frequency band(s), IMSI code of the mobile device used, download throughput, signal levels, signal quality, interference, dropped calls, blocked calls, anomalous events, call statistics, service level statistics, quality of service (QoS) information, handover information, neighboring cell information, GPS location coordinates, combination of the same or the like.

In various embodiments, the drive test service 102 can include one or more computing devices to implement population distribution-based drive test related functions described herein. In various embodiments, the drive test service 102 interfaces or otherwise communicates with one or more elements of the 5G network core via the communication connections 110, with drive test devices (such as devices 124a-124c) directly or indirectly, with cell sites (e.g., cellular towers or controllers thereof), with other systems or devices external to the 5G network, or with a combination thereof. In some embodiments, the drive test service 102 is partly or entirely implemented inside or outside the 5G network core. In some embodiments, at least part of the drive test service 102 is implemented by one or more drive test devices 124a-124c.

The above description of the exemplary networked environment 100 and the various services, systems, networks, and devices therein is intended as a broad, non-limiting overview of an example environment in which various embodiments of the presently disclosed technologies may be implemented. FIG. 1 illustrates just one example of an operating environment, and the various embodiments discussed herein are not limited to such an environment. In particular, the networked environment 100 may contain other devices, systems, or media not specifically described herein.

Figure 2:
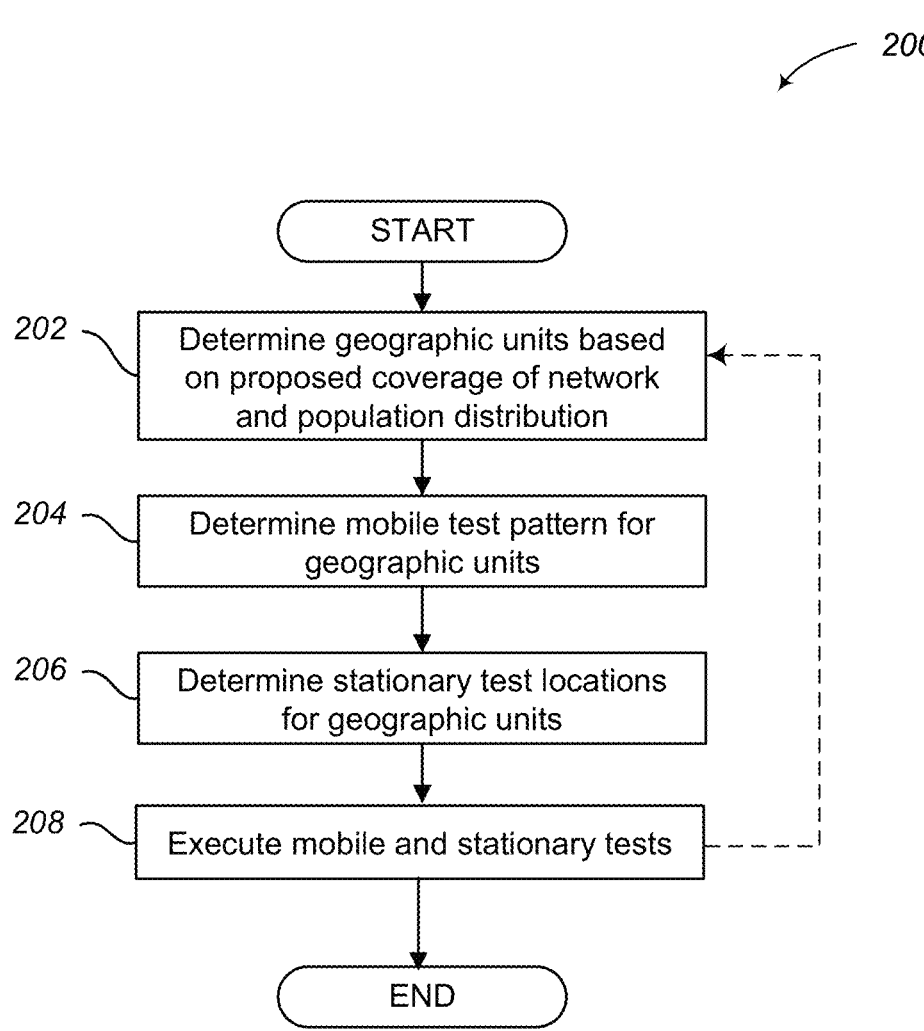
FIG. 2 is a flow diagram depicting an example process for population distribution-based drive testing for a communications network in accordance with some embodiments of the techniques described herein.

FIG. 2 is a flow diagram depicting an example process 200 for population distribution-based drive testing for a communications network (e.g., a 5G network as described above) in accordance with some embodiments of the techniques described herein. In various embodiments, the process 200 is performed in real time and based on mobile and stationary tests using, e.g., drive test devices 124a-124c of FIG. 1 as they move along network coverage areas collecting data. Illustratively, at least some part of the process 200 can be implemented by the drive test service 102, or one or more drive test devices 124a-124c.

The process 200 starts at block 202, which includes determining geographic units for drive testing based on a proposed coverage the communications network (or one of its services, functions, upgrades, or configurations) and population distribution associated with the proposed coverage. In some embodiments, the proposed coverage includes anticipated geographic footprint or coverage (e.g., service-wide coverage, district-wide coverage, nation-wide coverage, world-wide coverage, or the like) of the communications network.

Geographic units are determined, e.g., to avoid undue burden on the network while also providing sufficient data for statistically robust sampling. The geographic units can be defined based on census boundaries (e.g., census blocks, census block groups, or census tracts), ZIP Code Tabulation Areas (ZCTAs), standardized grids (e.g., 1 km×1 km cells, hex-8 coordinate system), combination of the same or the like. In some embodiments, census tracts are determined to be a candidate type of geographic units for drive testing, as they scale with population (e.g., change with differences in population density or geography type) and have drivable sizes. In these embodiments, each census tract includes a small number of census block groups, which are themselves composed of granular census blocks (e.g., a single city block). The census block groups or granular census blocks may or may not be adjacent to one another.

In some embodiments, the process 200 includes filtering available geographic units based on the proposed coverage of the communications network. For example, some census tracts may not be covered by the proposed coverage, some may be only partially covered, and some may be completely covered. By intersecting the proposed coverage with the boundaries of available geographic units, the geographic units with no proposed coverage can be filtered out and excluded from drive testing. In some embodiments, for geographic units that partially overlaps the proposed coverage, only those with population centroids within the proposed coverage footprint are retained, while other geographic units with partial coverage are excluded from drive testing. Filtering techniques based on a combination of the proposed coverage and population distribution can provide considerable savings on computational and transportation resources for drive testing. Alternatively or in addition, various sampling techniques (e.g., random sampling, population weighted sampling, drivability weighted sampling, or the like) can be used to sample the geographic units, so that only a subset (e.g., 10%, 5%, or 1%) of the geographic units is used as a basis for driving testing, which still provides a statistically robust representation of the overall network performance. As such, alternative or additional savings on resources can be achieved.

At block 204, the process 200 includes determining a mobile test pattern for each geographic unit. A mobile test pattern can include one or more routes, connected or unconnected to one another, in which one or more drive test devices can be moved along to collect data regarding the communications network. In some embodiments, a mobile test pattern for a geographic unit can include available drivable routes based on the boundary of the geographic unit, including the main roads adjacent to, or close to, the edges of the geographic unit, or immediately within the perimeter that surrounds the census tract. Such route(s) can be calculated based, for example, on an optimization equation that seeks to minimize the area between the route and the boundary of the geographic unit.

In some embodiments, the mobile test pattern for a geographic unit can include one or more roads that traverse the geographic unit as close as possible to the middle of the geographic unit. In some embodiments, the mobile test pattern for a geographic unit can include one or more full or partial loops around the population centroid of the geographic unit. In various embodiments, the mobile test pattern for a geographic unit can include one or more routes that mimic the population distribution within the geographic unit, e.g., one or more routes are selected to be through or adjacent to population densities within the geographic unit meeting or exceeding a selected threshold percentage of the entire population of the geographic unit. In some embodiments, the mobile test pattern can include drive routes that do not extend beyond the geographic unit boundary, e.g., thereby to minimize backtracking over an already-driven road. In some embodiments, because a geographic unit (e.g., a census tract) can be defined by highways or other high-traffic routes, some portion(s) of a drive route can be close enough the border of the geographic unit to be identified as traversing more than one geographic unit. In these cases, a mobile test can be considered to be located within a geographic unit when the starting location of the drive route is located within the geographic unit. Various optimization equations, subject to different constraints, can be used to calculate the drive routes.

At block 206, the process 200 includes determining a predetermined quantity or dynamically generated quantity of stationary test locations for each geographic unit. A stationary test location is a location where a drive test device may stop or otherwise remain stationary to perform tests for the communications network. In some embodiments, the stationary test locations include locations along the perimeter of the geographic unit, spaced approximately evenly at points of highway intersections or the geographic unit boundary itself. Such location(s) can be calculated based, for example, on an optimization equation that seeks to minimize the standard deviation of distances between candidate locations. In some embodiments, determining stationary test locations along the perimeter of a geographic unit can be based on a sufficient proximity (e.g., under a threshold distance) of candidate locations to commercial areas with higher concentrations of users, or a sufficient spacing (e.g., exceeding a threshold distance) between candidate locations and a concentration of residential properties that may present barriers to access. In some embodiments, near equal spacing between stationary test locations may not be possible or practical due to the nature of the geographic unit (e.g., bodies of water, lack of intersections, private gated communities, or the like) and the corresponding stationary test location can be shifted to a closest available location.

Figure 3A:
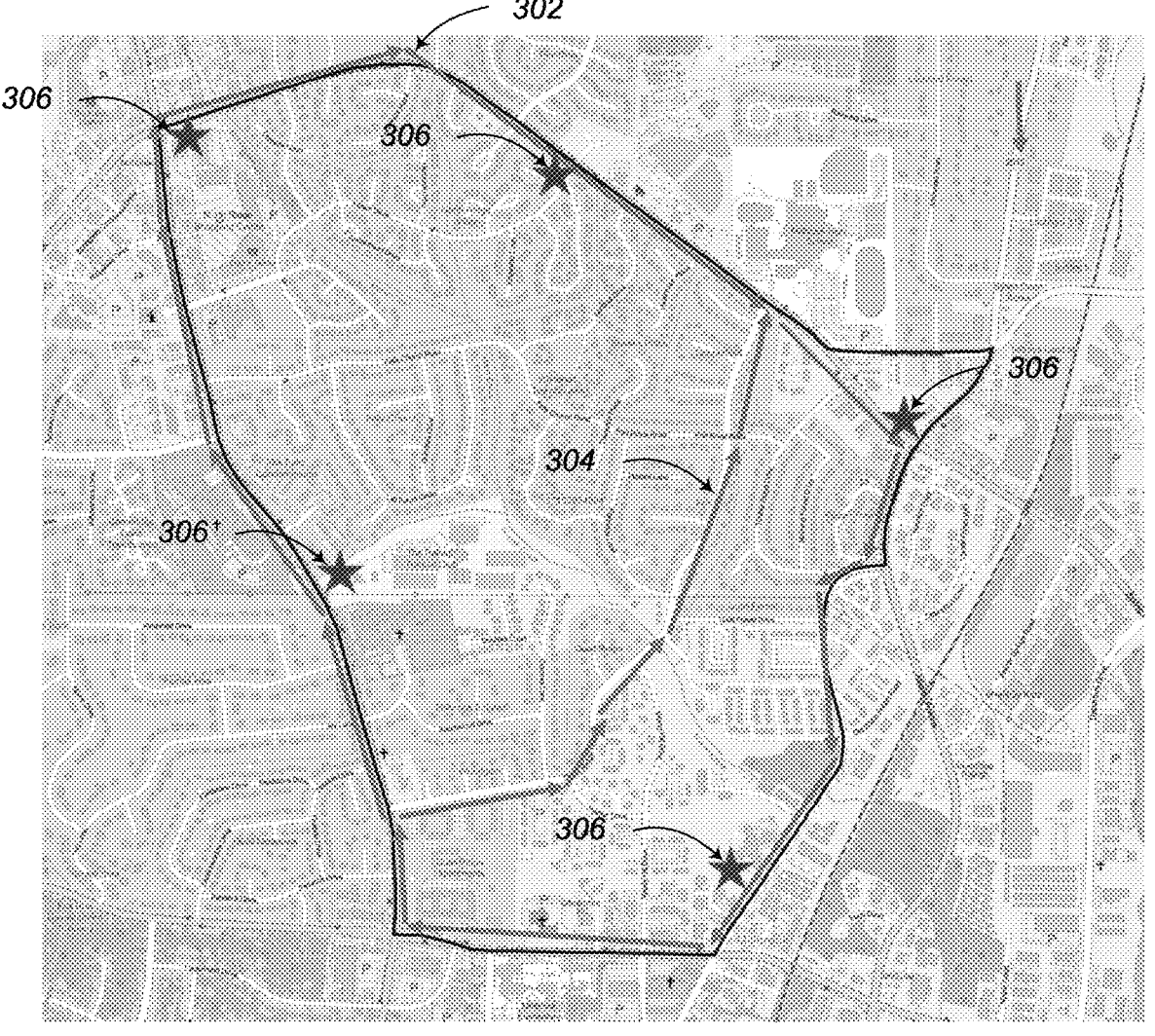
FIGS. 3a-3d illustrate examples of mobile test patterns and stationary test locations determined for different geographic units, in accordance with some embodiments of the techniques described herein.
Figure 3B:
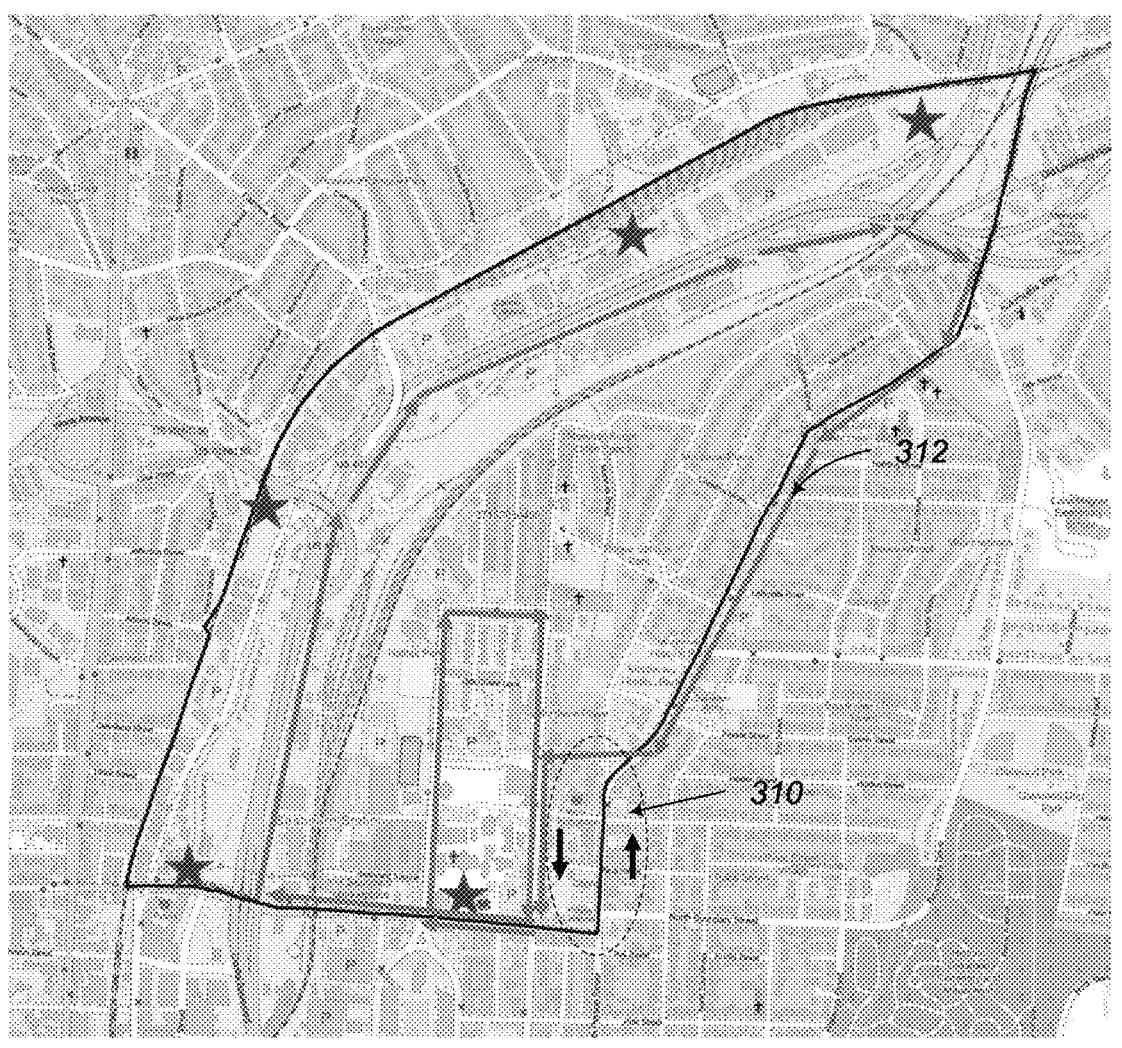
Figure 3C:
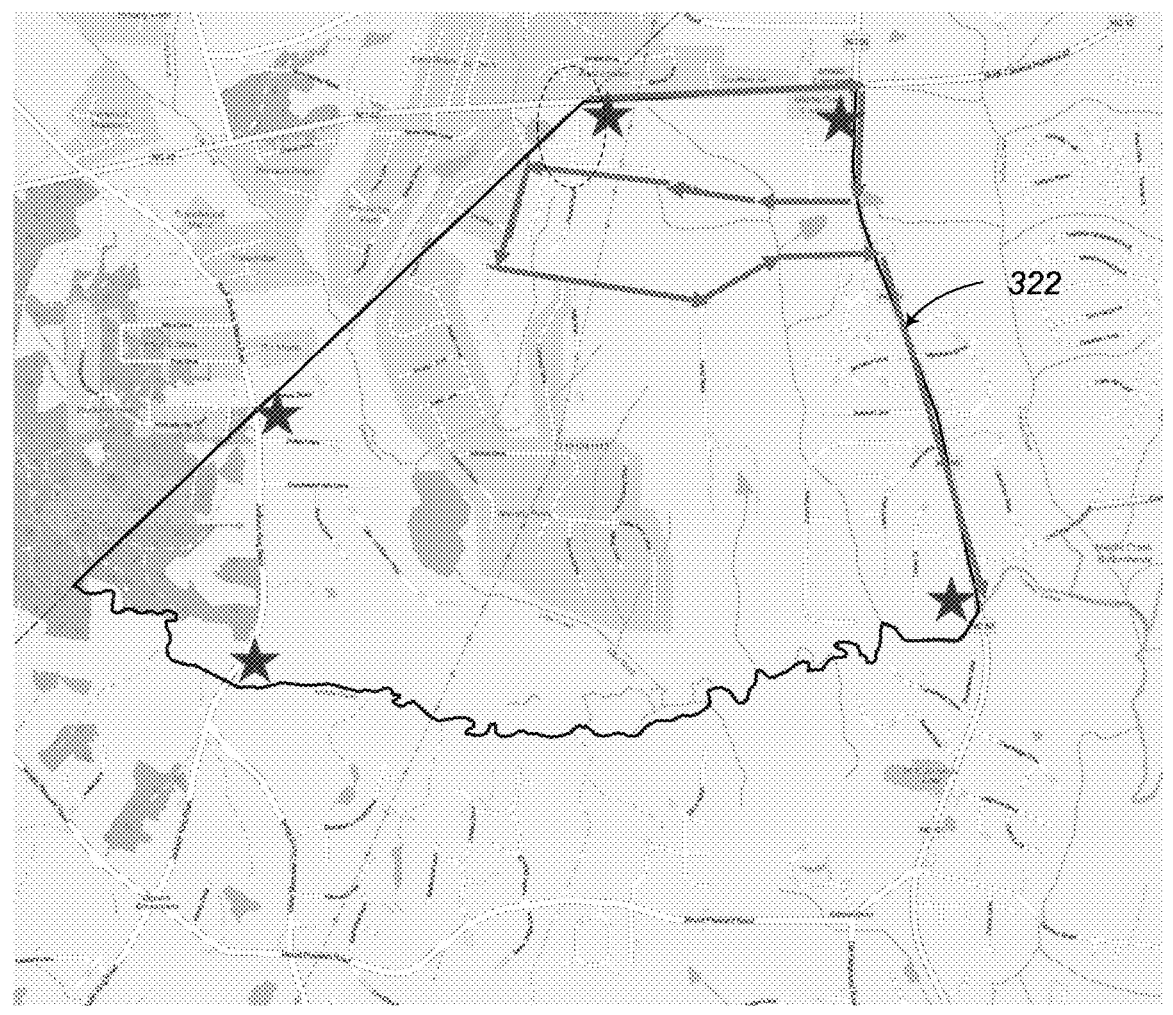

FIGS. 3a-3d illustrate examples of mobile test patterns and stationary test locations determined for different geographic units (e.g., census tracts). As shown in FIG. 3a, a mobile test pattern includes a drive route 302 based on the boundary of a corresponding geographic unit and a drive route 304 based on a middle traversal of the corresponding geographic unit; stationary test locations 306 are determined based on the perimeter of the corresponding geographic unit and spaced out approximately evenly. As shown in FIG. 3b, a mobile test pattern includes a drive route 312 based on the boundary of a corresponding geographic unit, subject to a traffic regulation constraint 310 (e.g., one-way streets). As shown in FIG. 3c, a mobile test pattern includes a drive route 322 based on both the boundary of a corresponding geographic unit and a middle traversal thereof, subject to a constraint where certain portions of the geographic unit's boundary lack drivable road in proximity.

Figure 3D:
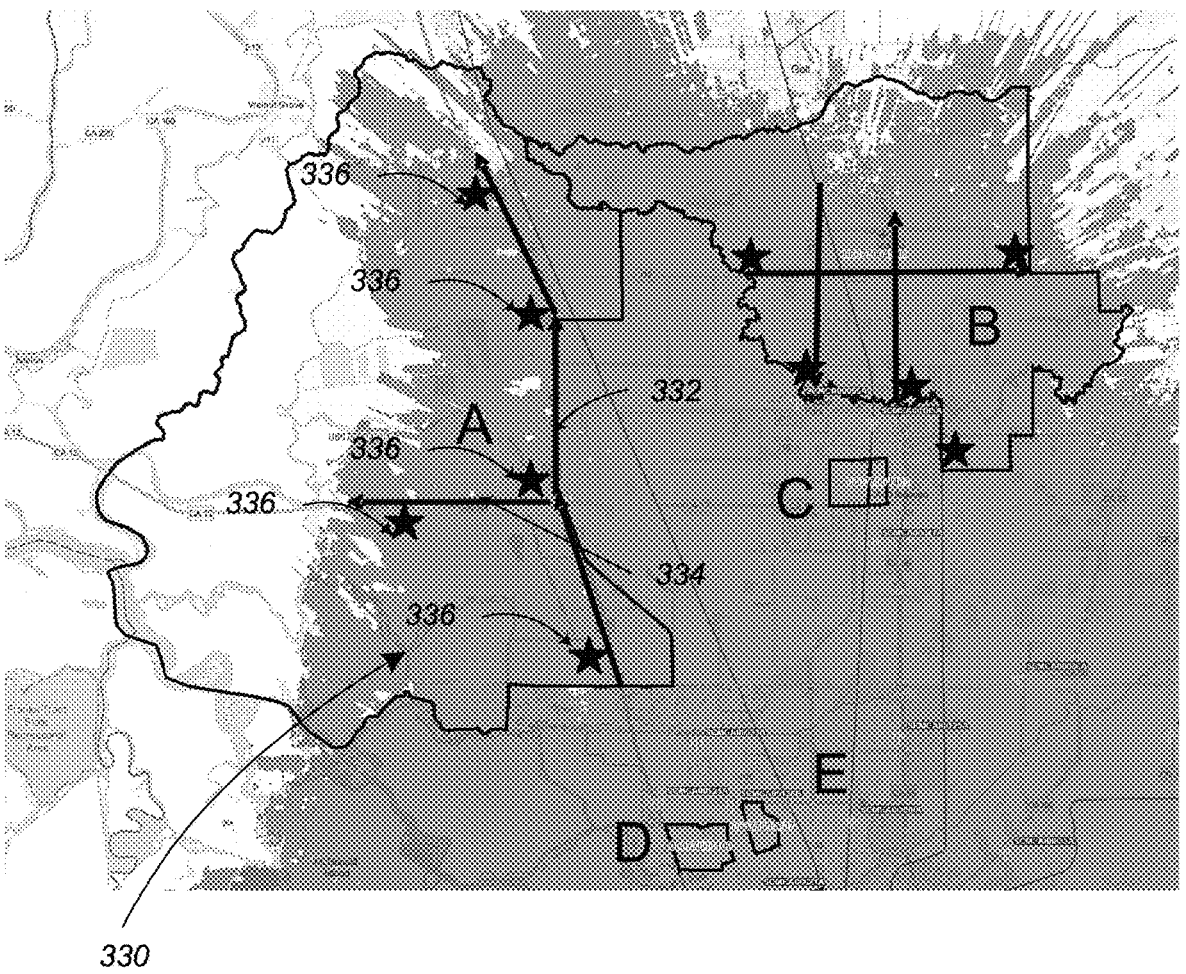

As shown in FIG. 3d, area 330 represents a partial coverage area of the communications network within a corresponding geographic unit. In this scenario, the partial coverage area can be treated as the target area of the corresponding graphic unit, for the determining of mobile test pattern and stationary test locations. In other words, the drive test area is reduced to save on testing resources, as the remaining area not covered by the proposed coverage of the communications network is excluded. Accordingly, a mobile test pattern includes a drive route 332 based on the boundary of the area 330 and a drive route 336 based on a middle traversal of the area 330; stationary test locations 336 are determined based on the perimeter of the area 330.

Referring back to FIG. 2, at block 208, the process 200 includes executing drive tests, including mobile tests and stationary tests, for each geographic unit. In accordance with the pattern and locations determined at blocks 204 and 206, the drive test service 102 can cause performance of mobile and stationary tests for the communications network. In some embodiments, actual location(s) for stationary test is further determined to be the area(s) reachable or accessible, e.g., by a corresponding drive test device, that is closest to the location(s) determined at block 206.

The mobile and stationary tests can be performed in accordance with a predetermined time frame and/or a sequence (e.g., straight line or tree-shaped) of geographic units. Mobile testing along a drive route within a mobile test pattern can include one or more distinct data sessions (e.g., each lasting for approximately 30-60 seconds). Each stationary test at a stationary test location can include a single data session.

Test results can be analyzed at the geographic unit level. For each geographic unit, for example, all test data records within a given data session can be averaged together to estimate a network performance metric (e.g., a download speed) for that session. All stationary results can be averaged to calculate an average stationary result, and the results of all mobile data sessions can be averaged together to calculate an average mobile result. The average stationary result and average mobile result can then be averaged together to calculate an average result for the geographic unit. The results for individual geographic units can be weighted or otherwise qualified by their corresponding population, then combined to generate a result for the communications network.

The various operations depicted via FIG. 2, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
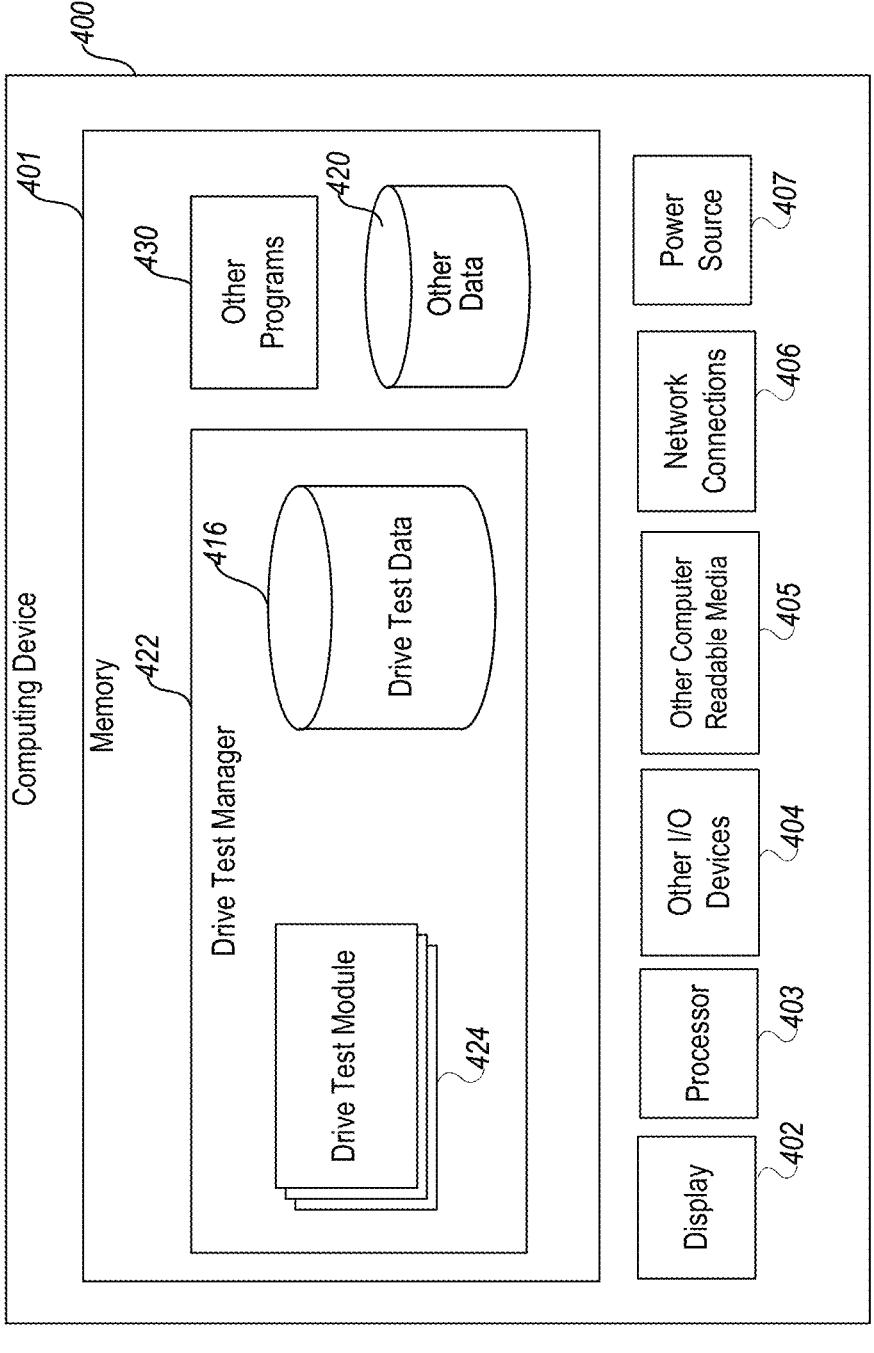
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a drive test service 102, one of test drive devices 124a-124c, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the drive test manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The drive test manager 422 is shown residing in memory 401. In other embodiments, some portion of the contents and some, or all, of the components of the drive test manager 422 may be stored on and/or transmitted over the other computer-readable media 405. The components of the computing device 400 and drive test manager 422 can execute on one or more processors 403 and implement applicable functions described herein. In some embodiments, the drive test manager 422 may operate as, be part of, or work in conjunction and/or cooperation with other software applications stored in memory 401 or on various other computing devices. In some embodiments, the drive test manager 422 also facilitates communication with peripheral devices via the I/O devices 404, or with another device or system via the network connections 406.

The one or more drive test modules 424 is configured to perform actions related, directly or indirectly, to the census-based drive test technology as described herein. In some embodiments, the drive test module(s) 424 stores, retrieves, or otherwise accesses at least some drive test-related data on some portion of the drive test data storage 416 or other data storage internal or external to the computing device 400. In various embodiments, at least some of the drive test modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and drive test manager 422 include API(s) that provides programmatic access to add, remove, or change one or more functions of the computing device 400. In some embodiments, components/modules of the computing device 400 and drive test manager 422 are implemented using standard programming techniques. For example, the drive test manager 422 may be implemented as an executable running on the processor(s) 403, along with one or more static or dynamic libraries. In other embodiments, the computing device 400 and drive test manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the drive test manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a drive test manager 422 implementation. Also, other functions could be implemented and/or performed by each component/module, and in different orders, and by different components/modules, yet still achieve the functions of the computing device 400 and drive test manager 422.

In addition, programming interfaces to the data stored as part of the computing device 400 and drive test manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The drive test data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the drive test manager 422.

Furthermore, in some embodiments, some or all of the components of the computing device 400 and drive test manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for drive testing a communications network, the method comprising:

determining a plurality of geographic units for drive testing based on a proposed coverage of the communications network and a population distribution of potential users of the communications network;

for each geographic unit of the plurality of geographic units:

determining a mobile test pattern and a set of stationary test locations for drive testing based on at least one of a geographic characteristic or population characteristic of the geographic unit, including:

performing an even distribution of the set of stationary test locations along a perimeter of the geographic unit, subject to one or more constraints that include at least one of a proximity to commercial areas, spacing to a concentration of residential properties, a body of water, a lack of intersections, or a private gated community; and causing performance of drive testing in accordance with the mobile test pattern and the set of stationary test locations.

2. The method of claim 1, wherein the population distribution is represented by census data and the plurality of geographic units includes one or more census tracts.

3. The method of claim 2, wherein determining the plurality of geographic units includes filtering out at least one census tract based on intersecting the proposed coverage of the communications network with boundaries of census tracts.

4. The method of claim 1, wherein determining the mobile test pattern comprises determining one or more routes based on a boundary of the geographic unit.

5. The method of claim 1, wherein determining the mobile test pattern comprises determining at least one of a middle traversal of the geographic unit or a full or partial loop around a population centroid of the geographic unit.

6. The method of claim 1, wherein determining the mobile test pattern and the set of stationary test locations is based on a partial coverage area of the communications network within the geographic unit.

7. A drive test system for a communications network, comprising:

at least one memory that stores computer executable instructions; and at least one processor that executes the computer executable instructions to cause actions to be performed, the actions comprising:

determining a plurality of geographic units for drive testing based on a proposed coverage of the communications network and a population distribution of potential users of the communications network;

for each geographic unit of the plurality of geographic units:

determining a mobile test pattern and a set of stationary test locations for drive testing, including:

determining at least one of a middle traversal of the geographic unit or a full or partial loop around a population centroid of the geographic unit; and causing performance of drive testing in accordance with the mobile test pattern and the set of stationary test locations.

8. The system of claim 7, wherein determining the plurality of geographic units comprises excluding at least one geographic unit based on intersecting the proposed coverage of the communications network with boundaries of geographic units.

9. The system of claim 7, wherein determining the mobile test pattern comprises determining one or more routes based on a boundary of the geographic unit.

10. The system of claim 7, wherein determining the set of stationary test locations comprises performing an even distribution of the set of stationary test locations along a perimeter of the geographic unit.

11. The system of claim 7, wherein determining the mobile test pattern and the set of stationary test locations is based on a partial coverage area of the communications network within the geographic unit.

12. A non-transitory computer-readable medium storing contents that, when executed by one or more processors, cause actions to be performed, the actions comprising:

determining a plurality of geographic units for drive testing a communications network based on a proposed coverage of the communications network and a population distribution of potential users of the communications network;

for each geographic unit of the plurality of geographic units:

determining a mobile test pattern and a set of stationary test locations for drive testing, including:

determining at least one of a middle traversal of the geographic unit or a full or partial loop around a population centroid of the geographic unit; and causing performance of drive testing in accordance with the mobile test pattern and the set of stationary test locations.

13. The computer-readable medium of claim 12, wherein the population distribution is represented by census data and the plurality of geographic units includes one or more census tracts.

14. The computer-readable medium of claim 13, wherein determining the plurality of geographic units comprises excluding at least one census tract based on intersecting the proposed coverage of the communications network with boundaries of census tracts.

15. The computer-readable medium of claim 12, wherein determining the mobile test pattern comprises determining one or more routes based on a boundary of the geographic unit.

16. The computer-readable medium of claim 12, wherein determining the set of stationary test locations comprises performing an even distribution of the set of stationary test locations along a perimeter of the geographic unit.

* * * * *